(12) United States Patent
Bourg, Jr. et al.

(10) Patent No.: US 9,134,711 B2
(45) Date of Patent: Sep. 15, 2015

(54) ADVANCED BATCH CONTROL

(75) Inventors: Wilfred Marcellien Bourg, Jr., Melissa, TX (US); Mark-John Bruwer, Hamilton (CA); John Fredrick MacGregor, Dundas (CA); Ivan P. Miletic, Hamilton (CA); David John Pieterse, Welland (CA); Dale M. Smith, Amherst, OH (US)

(73) Assignee: FRITO-LAY NORTH AMERICA, INC., Plano, TX (US)

( * ) Notice: Subject to any disclaimer, the term of this patent is extended or adjusted under 35 U.S.C. 154(b) by 1526 days.

(21) Appl. No.: 12/773,485

(22) Filed: May 4, 2010

(65) Prior Publication Data

US 2011/0276164 A1 Nov. 10, 2011

(51) Int. Cl.
*G05B 13/04* (2006.01)

(52) U.S. Cl.
CPC .... *G05B 13/042* (2013.01); *G05B 2219/32017* (2013.01)

(58) Field of Classification Search
CPC .............. G05B 19/41865; G05B 2219/41086; G05B 2219/32077; G05B 2219/31449
USPC ........................... 700/266; 702/19, 22, 31, 32
See application file for complete search history.

(56) References Cited

U.S. PATENT DOCUMENTS

| 5,282,149 | A | | 1/1994 | Grandone et al. |
| 5,493,631 | A | * | 2/1996 | Huang et al. ................. 706/23 |
| 5,822,740 | A | * | 10/1998 | Haissig et al. ................. 706/3 |
| 6,532,454 | B1 | * | 3/2003 | Werbos ........................... 706/14 |
| 7,540,992 | B2 | | 6/2009 | Morel |
| 2006/0019007 | A1 | | 1/2006 | Baas et al. |
| 2007/0045277 | A1 | * | 3/2007 | Smarda et al. ................ 219/386 |
| 2007/0243626 | A1 | | 10/2007 | Windeyer et al. |
| 2009/0017178 | A1 | | 1/2009 | Desai et al. |
| 2012/0003623 | A1 | * | 1/2012 | Bartee et al. ..................... 435/3 |

OTHER PUBLICATIONS

Flores-Cerrillo, J. and MacGregor, J.F., "Control of Particle Size Distributions in Emulsion Polymerization using Mid-Course Correction Policies," Ind. & Eng. Chem. Res., 2001, pp. 1805-1814, vol. 41.
Flores-Cerrillo, J. and MacGregor, J.F., "Within-Batch and Batch-to-Batch Inferential Adaptive Control of Semi-Batch Reactors: A Partial Least Squares Approach," Ind. & Eng. Chem. Res., 2003, pp. 3334-3345, vol. 42.
Yabuki, Y. and MacGregor, J.F., "Product Quality Control in Semi-Batch Reactors using MidCourse Correction Policies," Ind. Eng. Chem Res., 1997, pp. 1268-1275, vol. 36.
Flores-Cerrillo, "Control of batch product quality by trajectory manipulation using latent variable models," J. Process Control, 2004, pp. 539-553, vol. 14, 15 pages.
Flores-Cerrillo, Uncorrected proof of article in press entitled "Latent variable MPC for trajectory tracking in batch processes," J. Process Control, 2005, pp. 615-663, vol. 15, 13 pages.
Tsen, A.Y., "Predictive Control of Quality in a Batch Polymerization Using a Hybrid Artificial Neural Network Model," AIChE J. 42, pp. 455-465, 1996, 11 pages.
Yabuki, Y., Nagasawa, T., "An Industrial Experience with Product Quality Control in Semi-Batch Processes," Computers & Chem. Eng., 2000, pp. 585-590, vol. 24, 6 pages.

* cited by examiner

*Primary Examiner* — Shogo Sasaki
(74) *Attorney, Agent, or Firm* — Colin P. Cahoon; Stephen Y. Liu; Carstens & Cahoon, LLP

(57) ABSTRACT

A method for advanced batch control of a batch process. The method discloses completing at least one cycle of the batch process and collecting data on at least one process variable and at least one product property. A model is created based on the data, wherein the model comprises inputs. Thereafter the batch process is initiated. At one or more decision points the model is utilized to obtain outputs. A controller utilizes the model outputs to control the batch in accordance with the model outputs. Final product properties are reached at decreased variability compared to the prior art.

22 Claims, 5 Drawing Sheets

ADVANCED BATCH CONTROL

BACKGROUND

1. Technical Field

The present invention relates to a method for advanced control of batch processes.

2. Description of Related Art

Many types of products are made in batch or semi-batch processes. Often the control systems for batch processes are relatively crude compared to continuous processes. One reason for this is that it is often difficult to measure the product in a batch process. Moreover, the quality characteristics of the final product are only directly evident at batch completion. Further, as one skilled in the art would understand, often batch processes also exhibit large time constants and time varying gains and dynamics. As such, complex nonlinear dynamic models are needed for control models, which are often unavailable for industrial processes. Because it is often difficult to measure the properties of a product until the end of the batch, the basic automation system generally attempts to repeatably adhere to defined recipe conditions in the hope that these conditions will yield acceptable product. For future batches if the actual value was different than the expected value, then the recipe of the process conditions of the future batch can be adjusted. Thus, prior art batch process control systems are feedback or reactionary control systems. Such basic control systems cannot or do not proactively compensate for the incoming disturbances that are inherent in any process. As such, basic control systems in batch operations often have great variability in the final product specifications compared to continuous processes that can be continuously monitored and adjusted to meet a desired final specification. Accordingly, it is desirable to have an advanced batch control system that can offer better control over the batch system by decreasing variability. Further, it is desirable that an advanced batch control system be able to better predict and obtain desired final product properties, as well as improve process efficiency and process operability.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1A:
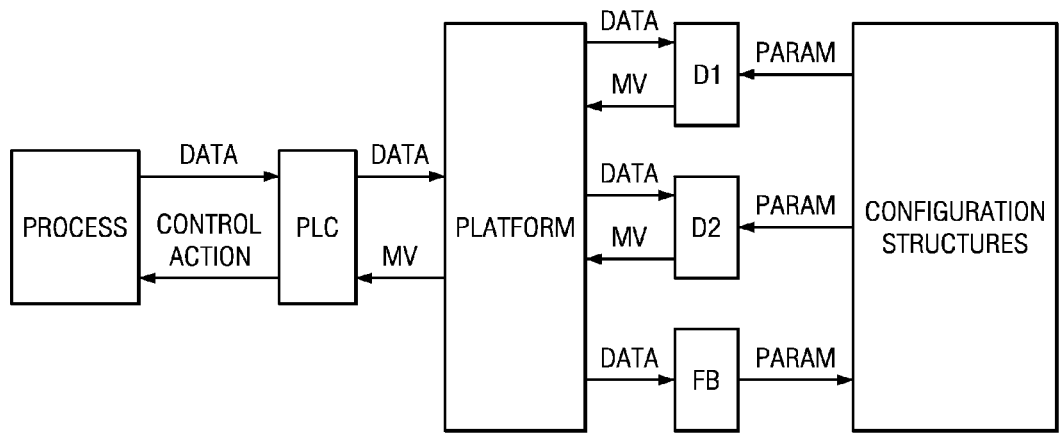
FIG. 1a illustrates the overall control architecture in one embodiment.

Several embodiments of Applicants' invention will now be described with reference to the drawings. Unless otherwise noted, like elements will be identified by identical numbers throughout all figures.

In one embodiment a method for advanced batch control over a batch process is disclosed. In one embodiment the advanced batch controller comprises optimization problems that are solved to provide actionable targets, such as set points, for controllers at the Programmable Logic Controller (hereinafter "PLC") level or the Distributed Control System (hereinafter "DCS") level. In one embodiment optimization problems are posed in a way that ensures that pre-selected targets for key process variables or final product quality variables are met and result in changes to the PLC set points that are needed to reach the target values.

As will be discussed in more detail below, the method can be applied to batch, semi-batch, and transient portions of continuous processes. Generally, batch processes are processes where all the materials are charged into a vessel at the start of the batch and then processed for a finite time under time varying process conditions. Thereafter, at some condition that defines the end point, such as a passing of a fixed amount of processing time or the achievement of a certain condition, the final product is discharged from the batch process. As used herein a "material" refers to any material placed into a batch process. As used herein a "final product" refers to the product as it exists when the batch process has finished or when the product is removed from the batch process. Semi-batch processes are like batch processes except that some material is charged or discharged during the transient portions of the batch.

Additionally, continuous processes often comprise transient portions such as during start-up, during shut-down, or during transition from a first operating condition to a second operating condition and can occur during product grade changes, for example. Such transitional processes are transient because there is a definable start time and a finish time. In one embodiment, the advanced batch controller can be applied to control and refine these transient portions of continuous processes. As such, the term batch, as used herein, shall refer to batch, semi-batch, and transient portions of continuous processes.

In one embodiment the advanced batch control methodology is based upon the following: (i) developing empirical or semi-empirical models of the transient operation based on data collected from batches under existing operation and under conditions in which designed experiments have been performed; (ii) defining a finite number of decision points throughout the progress of the batch process at which control will be applied; (iii) using the models for each decision point and the available measurements at those points to predict the final product quality attributes or the features of the transient operation that it is desired to control; (iv) developing advanced control algorithms for use at each decision point based on the use of the models and their predictions at each decision point and on measurements that will be available at each decision point; (v) implementing these control algorithms in real time on new batches at each decision point using the models and controllers developed for those decision points and the measurements from the new batch that are available at each decision point.

Data Collection

The first step in the advanced batch control method is the collection of data. The data are used to build a model which can be employed by the control algorithm. In one embodiment, a model refers to a mathematical description of the batch process. As discussed above, the models may be empirical, semi-empirical, or fundamental models. As used herein a control algorithm refers to any algorithm, analytical or numerical optimization solver that calculates or estimates a control action. The advanced batch controller comprises the combination of a model and a control algorithm.

The data can be acquired with many methods and devices known in the art. In one embodiment the data are acquired using one or more of the following protocols: Object Linking and Embedding for Process Control Data Access (OPC-DA), Object Linking and Embedding for Process Control Historical Data Access (OPC-HDA), Open Database Connectivity (ODBC), or vendor specific data acquisition protocols such as those defined by the data historian vendor, OSI-PI. Those skilled in the art will understand how to collect and store the data.

The data are collected on at least one batch cycle but in one embodiment is collected on multiple cycles. A cycle begins with the initiation of the batch and finishes upon the completion of a batch. The amount of data to be collected and the number of batch cycles included in the collected data will depend on the specific embodiment being monitored. In one embodiment, collecting data on a single batch results in an acceptable model. As will be described herein in some embodiments the model includes a corrective bias whereby the model can adjust overtime to become more accurate by comparing the predicted result with the actual result. In other embodiments the data are collected on two or more batches to obtain a more complete data set to build a more accurate initial model. In one embodiment a model is progressively adjusted to yield better results batch after batch. In one embodiment better results comprises decreased variability. In one embodiment, more than two batches are monitored to provide a data set. Further, in one embodiment the batch conditions during data collection are similar to the conditions in which the model will be utilized.

In one embodiment the advanced batch controller can be configured to run a batch or series of batches according to a programmed design so that the batches can be suitably perturbed and the data recorded. This allows for the collection of high quality data for building or updating the model over a variety of conditions.

As will be discussed in more detail below, empirical, semi-empirical, and fundamental models may be employed to create the advanced batch control or algorithm. In one embodiment, the model is based, at least in part, on empirical results. In some embodiments strictly fundamental models are unfavorable as it is costly and time consuming to build reliable fundamental models for a real industrial process. Furthermore, often some aspects of the process may be very difficult, if not impossible, to model. Fundamental models can often only use variables that can be explicitly accounted for in the mechanisms described by these models. Contrariwise, empirical or semi-empirical models can extract and incorporate useful information from all available measurements; even obscure measurements that may not be incorporated into a fundamental model, such as torque on an agitator shaft, for example, may be accounted for in the empirical models. Consequently, most embodiments utilize only empirical or semi-empirical methods as opposed to strictly fundamental methods. Semi-empirical methods are understood to mean a hybrid modeling method in which models of fundamental mechanisms are combined with empirical modeling methods. In one embodiment the semi-empirical methods include a hybrid of fundamental mechanisms combined with empirical modeling methods that account for those phenomena not captured by the fundamental part of the model. One example would be to incorporate dimensionless numbers, such as the Reynolds Number, as additional variables in an otherwise purely empirical model. Another example would be to compute some fundamentally meaningful quantities such as the energy released due to reaction from some direct measurements, such as temperatures and flows. These calculated fundamental variables are then used as variables in building the semi-empirical models.

In one embodiment, the collected data comprises data relating to at least one process variable. In other embodiments the collected data comprises a plurality of process variables. A process variable is anything that can either affect or is indicative of the processing of a batch. There are many types of process variables, including the measurable properties of the material as well as process conditions. A measurable property of the material includes any measurable property of the material. This includes, but is not limited to, molecular weight, moisture content, percent solids, viscosity, density, texture, color, etc. A process condition is any measurable processing condition of the batch. This includes, but is not limited to pressure, temperature, time, the rate of heating or cooling, the rate of a fluid being supplied to a jacket, gas or liquid flow rate, duty of a burner or heat exchanger, the speed of an agitator, the torque of an agitator, the rate of a circulating pump, etc.

The collected data also include data associated with the final or intermediate product properties. A "final product property" refers to any measurable property of the final product. An "intermediate product" is a product that has been processed in the batch but is not yet a final product. The final or intermediate product properties can include, but are not limited to moisture content, salt content, oil content, percent solids, color, texture, level of a compositional compound including but not limited to Acrylamide, percent purity or impurity, conversion, temperature, density, viscosity, molecular weight, concentration, coating thickness, etc. Essentially, anything that can be measured on the product in a quality control lab that is important to the end use of the product can be considered a product property. In one embodiment the final or intermediate product properties are measured by on-line instruments located at the end of the batch. In other embodiments the final or intermediate product properties are measured off-line, for example in a quality control laboratory. In one embodiment the final or intermediate product properties are measured days or even weeks after the completion of the batch. In such an embodiment, the model is built using past data where these measurements have been made and the advanced batch controller then controls the predicted values of these to a set point with minimum variability about that set-point.

The data collected can include time histories of one or more process variables referred to as process variable trajectories. For example, if the temperature of a batch is monitored over time, the resulting temperature trajectory, including slope, minimum and maximum points, average temperatures, etc. can also be collected. Likewise, data related to discrete trigger events may also be collected. This would include, as an example, an agitator or pump turning on or off at a certain time in the process or in response to a reached processing condition.

Model Creation

After collecting data on at least one process variable then at least one model is created. Further, an advanced batch controller is created which uses the model to generate outputs.

As discussed, a wide variety of data can be included in the models. In one embodiment the data are directly relatable to a final product property. For example, in one embodiment the temperature of a batch can have a direct effect on the final product properties. In other embodiments a relationship exists with interpreted data. Interpreted data can comprise many forms. In one embodiment calculations of the data results in a relationship with a final product property. For example, the interpreted data may comprise determining the slope of the data over a given time. In such an embodiment, the slope of the data may have a relationship on a final product property. Other interpreted data can include initial values, final values, maximum and minimum values, average values, variances, etc. Thus, in one embodiment while creating the model, the data is interpreted to see which features of the interpreted data have any impact on the process variables being modeled. Both the data and the altered data can be included in the created model.

There are a variety of methods to create the model including, but not limited to, partial least squares, canonical correlation regression, reduced rank regression, multi-linear regression including higher order polynomial terms, nonlinear regression, ridge regression, neural networks, fundamental mechanisms such as dimensionless groups, mass and energy balances, differential equation sets or a combination thereof. A good discussion of model building and solving can be found in, "Control of batch product quality by trajectory manipulation using latent variable models", Flores-Cerrillo, J. and J. F. MacGregor, J. Process Control, 14, 539-553, 2004, the entirety of which is incorporated herein by reference.

In one embodiment the models are exported electronically from offline model building software and repackaged for online use without manual intervention. In one embodiment the models comprise parameters that are updated recursively in real-time.

In some embodiments, when modeling a batch process it is useful to include the time histories of key measured process variables. The process history of a process variable can have a high degree of autocorrelation. Accordingly, the value at one point in time often exhibits a strong correlation with values at earlier points in time. This can cause the data to be ill-conditioned numerically. As a result, for some embodiments, latent variable regression and related methods such as ridge regression can provide stable empirical models for this type of data.

In one embodiment, the advanced batch controller is formulated as a generic quadratic programming problem. In one embodiment the problem is convex, can be solved efficiently, and can accommodate any relevant constraints to be imposed on the variables. An example of the quadratic programming problem is given below. In one embodiment, the quadratic programming problem formulation may be described by the following, or equivalent, equation set:

$$\min J/MV = (CV_{PRED} + CV_{BIAS} - CV_{SP})^T W_1 (CV_{PRED} + CV_{BIAS} - CV_{SP}) + \alpha_1 SPE + \alpha_2 T^2 + \alpha_3 (MV - MV_{SP})^T W_2 (MV - MV_{SP}) \quad (1a)$$

Subject to:

$$SPE \leq UCL_{SPE} \quad (1b)$$

$$T^2 \leq UCL_{T^2} \quad (1c)$$

$$LB_{MV} \leq MV \leq UB_{MV} \quad (1d)$$

$$[CV_{PRED} SPE, T^2] = PLS(MV, DV) \quad (1e)$$

$$W_1 = \text{diag}(w_1) \quad (1f)$$

$$W_2 = \text{diag}(c_1) \quad (1g)$$

The objective function is defined in equation (1a). The constraints to be obeyed are shown in equations (1b) to (1d). The model, in this case formed with Partial Least Squares (PLS) is shown equation (1e). The model can also be formulated explicitly as a set of constraints. The definition of the diagonal weighting matrices is shown in equations (1f) and (1g). The terms in equation (1) are defined in Table 1 below.

TABLE 1

| Term | Definition |
|---|---|
| | Definition of Terms |
| MV | Vector of manipulated variables - In one embodiment these are the set points that will be written to the PLC. |
| CV | Vector of controlled variables - In one embodiment these are the process conditions and final product properties that are to be controlled. |
| SPE | Squared prediction error - a measure of deviation from the correlation structure defined by a latent variable model |
| $T^2$ | Hotelling's $T^2$ - a measure of extrapolation within the latent variable model plane) |
| Subscript PRED | Predicted value |
| Subscript BIAS | Feedback bias adjustment |
| Subscript SP | Set point (target value) |
| $W_i$ | Quadratic penalty matrices |
| $\alpha_i$ | Penalty weighting factors |

It should be noted that the terms, $\alpha_1 SPE + \alpha_2 T^2$, in the objective function relate specifically to the use of a PLS model. These terms penalize extrapolation from the validity space of the PLS model. If a different model type were to be used, these terms can be replaced by a different metric or set of metrics for model extrapolation, as suitable to the chosen model type or types. The same is true of equations (1b) and (1c), which specify upper bounds on these two metrics. These constraint equations would be replaced with suitable constraint equations for the extrapolation metric(s) for the chosen model type or types. Further, regarding equation (1e), the equation indicates the specific choice of a PLS model type. However, any other model type or types, as relevant to the problem, or to the preference of the practitioner, could be used, the notation in equation (1e) being updated accordingly.

The models can comprise one, or a plurality, of inputs and outputs. An input is anything entered into the model and/or the advanced batch controller. In one embodiment a model comprises model inputs and model outputs. A model input is anything inputted into the model. In one embodiment, model outputs comprise controlled variables and/or predicted variables. In one embodiment, model inputs comprise manipulated variables and/or disturbance variables. As used herein "control output" refers to any result produced by the advanced batch controller. If a model output is produced by the advanced batch controller, then the model output is also a control output. As an example, if the model produces a predicted variable, that predicted variable can be considered a control output and a model output. Further, if the model input is produced by the advanced batch controller then that model input is a control output. In one embodiment the control output comprises instruction or data sent to the process by the advanced batch controller. In one embodiment the control output comprises only a single output whereas in other embodiments the output comprises a plurality of outputs. A process condition set point refers to the set point of a process condition. The control output can include, but is not limited to instructions to adjust process variables, including manipulated variables, a process condition set point, a predicted process variable, or a predicted final product property. As an example, one control output may comprise a set point of 240° F. Thereafter, the process is adjusted in order to reach the specified set point temperature. As used herein reaching a set point or condition refers to obtaining the set point within the acceptable tolerance. If the acceptable tolerance is +/−5% of the set point, then coming within that tolerance range is considered reaching the set point. In one embodiment the tolerance range is from 0 to about 20%, whereas in another embodiment the tolerance range is from 0 to about 10%. In still another embodiment the tolerance range is from 0 to about 5% and whereas in another embodiment the tolerance range is from 0 to about 1%.

Additionally, the control output may include a predicted intermediate product property. As noted above, it is often difficult, if not impossible, to accurately measure some product properties while being processed in a batch. As such, the model can predict the product properties at various points during processing. The model can predict intermediate product properties and final product properties. In some embodiments an intermediate product property must be reached before the next step of processing is applied. One example refers to chemical reactions and the corresponding conversion. A process can require that a specified amount of conversion take place before further processing. Consequently, the model may be used to predict the intermediate product property at some point during the batch process. The intermediate product properties can include the final product properties previously described. In one embodiment, the control output comprises a product property set point or instructions to reach the product property set point. A product property set point is a desired product property that the advanced batch controller attempts to reach.

As stated earlier, virtually any measurable process variable can be inputted into the models. The inputs can be specified as being either manipulated variables (MV's) that can be implemented or disturbance variables (DV's) that can only be observed. Examples of manipulated variables include those process variables which can be manipulated by the advanced batch controller. These include, but are not limited to, the process conditions listed above. Disturbance variables are those process variables which the control system cannot or does not control. Examples of disturbance variables include the product properties of the materials fed into the batch process. These can include the percentage of solids of a material entering the batch, the moisture content of the material, the initial temperature of the material, the molecular weight, etc. The disturbance variables can also include process conditions that affect the batch but that cannot easily be controlled. For example, atmospheric pressure at a given altitude, ambient temperature and ambient humidity are disturbance variables that can be taken into account but often are not easily compensated for. As an example, a model created for a process at sea level can be modified to a process at 6,000 feet of altitude by accounting for these disturbance variables. Taking the disturbance variables into account allows the model to account for non-uniform conditions even if these non-uniform conditions cannot be controlled. Another example includes the weight or composition of materials charged to the batch which can be variable, their moisture content, or the amount of impurities in the materials.

FIG. 1a illustrates the overall control architecture in one embodiment. In one embodiment, the PLC collects and transmits data concerning the process. This data is transmitted to the relevant platform. As previously stated, in one embodiment this platform can collect data from a variety of locations including for example, a historical database. The data is then transmitted to the advanced batch controller, shown here as D1 and D2. The advanced batch controller receives parameters from the configuration structures. These configuration structures are described below herein in reference to FIG. 3. These configuration structures can include control configuration structures, model parameter structures, and data parameter structures. These configuration structures provide the parameters to be used by the control algorithm and the model.

Figure 1B:
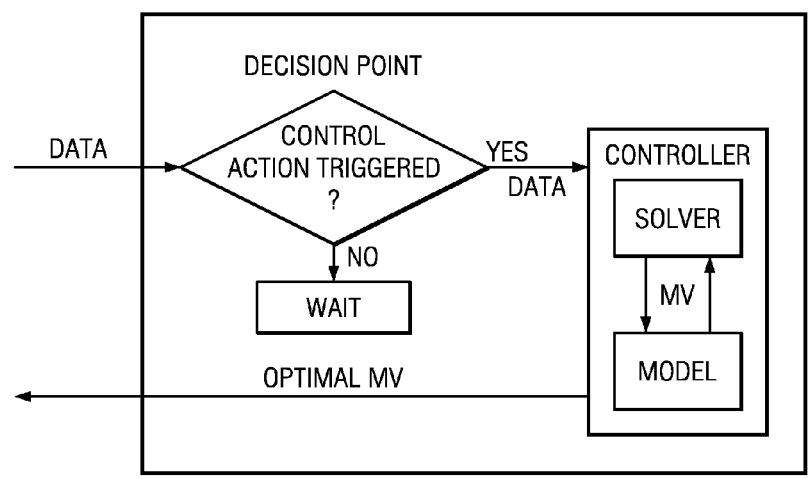
FIG. 1b illustrates the control architecture at a decision point in one embodiment.

The relationship between the control algorithm and the model is shown in FIG. 1b which is an enlarged subset of FIG. 1a. FIG. 1b illustrates the control architecture at a decision point in one embodiment. The model submits a manipulated variable to the control algorithm as shown by the SOLVER and the control algorithm submits a manipulated variable to the model. Thus, the manipulated variable is an input into the model but an output from the control algorithm. In one embodiment this process is completed iteratively until the manipulated variable is optimized. In one embodiment the manipulated variable comprises a vector of a plurality of optimized manipulated variables. The advanced batch controller then sends the optimal manipulated variable, the control output, back to the platform. The platform transmits this to the PLC which controls the process.

In one embodiment the input variables can be constrained by lower and upper bounds. Further, the variables can be constrained by inequality and equality constraints. One such example would be a valve position. A valve can only be 100% open or 0% open, or somewhere in between. Accordingly, a constraint can be placed on a valve position indicating that the number must be a positive real number ranging from 0 to 100. Further, in one embodiment these constraints can be updated dynamically as needed. In one embodiment the advanced batch controller comprises multiple constraints. In one embodiment the advanced batch controller comprises a combinatorial inequality constraint. An example of a combinatorial inequality constraint is when a weighted summation of two or more variables must be below an upper limit or above a lower limit. For example, if the sum of the masses of two or more materials added to the batch must be below an upper limit. In one embodiment the advanced batch controller comprises an equality constraint. In such an embodiment, two or more flow rates, or added amounts of materials, must be maintained in a fixed ratio. For example, for every pound of material A added to the batch process, two pounds of material B must be added.

In one embodiment one or more constraints, as described above, can be updated dynamically, either within a batch or from one batch to the next. For example, if a particular phase of a batch must be completed by a certain time, then a constraint on the maximum duration of that phase can be adjusted dynamically based on the sum of the durations of the preceding phases, which could vary from batch to batch.

In one embodiment some input variables are more relevant that other input variables. Accordingly, in one embodiment the manipulated variables are ranked in relative importance by applying relative weights in the manipulated variable penalty term. In one embodiment, these weights are forced to sum to one, but in other embodiment they are not. In addition, in one embodiment the manipulated variables are in scaled rather than their original engineering units. These considerations help maintain a consistent magnitude for this term regardless of the number of manipulated variables or choice of engineering units, thus aiding controller tuning. Further, this helps ensure that the optimization problem is numerically well conditioned. Those skilled in the art will understand that determining whether to rank the variables and assigning relative weights will be dependent on the specific embodiments. Further, in one embodiment a bias and/or multiplying factor can be applied to the calculated value for each manipulated variable before sending the instructions to the process. This provides additional tuning handles if needed.

In one embodiment, the model also includes a term that allows target values to be set for the manipulated variables. This can be used to specify ideal resting values for certain manipulated variables if there are excess degrees of freedom in the control problem. In addition, it allows relative costs to be applied to the manipulated variables so that secondary economic objectives can be built into the optimal control problem. For example, in one embodiment there are two sources of energy input to the batch process, such as a steam heat exchanger and an electric heating element. One heating source may have a more immediate effect on the process than the other. Conversely, one heating source may be considerably more expensive than the other per unit of energy delivered to the batch process. Having two sources of heating typically implies an excess degree of freedom. If economics are a primary driving force then an ideal resting value of "low" or "off" can be used for the expensive heating source. The advanced batch control system can then only manipulate this input away from its ideal resting value if the other heating source is at its maximum heating value and still more heat is required. Conversely, if fast dynamic response is a primary objective then an ideal resting value can be specified for the heating source that has a slower impact on the process, so that the advanced batch controller preferentially manipulates the heating source that has a rapid effect on the process. Thus, in one embodiment, the optimization formulation is run to coordinate the objectives of the one or more decision points so as to optimize one or more objectives including, but not limited to economic, operability, and performance objectives. In one embodiment the objectives consider cost of materials, operating costs, as well as any economic benefit such as selling price of the final product. In one embodiment relative weight of the objectives is specified via a weighting matrix.

In one embodiment, model outputs can be specified as either controlled variables (CV's) that are to be controlled, or predicted variables (PV's) that are merely to be predicted. In one embodiment the controlled variables includes a desired process condition. For example, the controlled variable can include a temperature set point. Altering the temperature set point alters the temperature trajectory, for example. Additionally, the controlled variables can include instructions for reaching a desired process variable or process condition. For example, if one controlled variable is the desired temperature, the advanced batch controller can instruct a valve to open the flow of heating fluid to increase the batch temperature. In one embodiment the advanced batch control communicates with the PLC control layer. Further, a control variable may include instructions for the batch to hold for a period of time.

In another embodiment the controlled variables include final product quality attributes. For example, the controlled variable can be the moisture content of the final product once it is removed from the batch process. In such an embodiment, the advanced batch controller can manipulate one or more process conditions, including the duration of the batch as one example, so as to reach the target moisture content at the end of the batch.

Predicted variables can include predicted process variables or predicted intermediate or final product quality attributes. By definition, the model merely predicts this variable or variables for use outside of the control system, but does not take any control action itself with respect to these predicted variables.

Time is another process variable which can be predicted and controlled. As an example, it is often desirable that a batch finish at a desired point in time, referred to as a desired finish time. The actual time at which the batch is finished is referred to as a finish time. One common example is where two batches are combined into a single batch for further processing. In such an example, it is often desirable that both batches finish at approximately the same finish time. Thus, the advanced batch controller, utilizing the model, can receive data regarding two or more batches and adjust one or both of the batches so that a specified processing step occurs at about the same time in both batches or that the batches finish at about the same finish time. Likewise, an advanced batch controller can adjust the processing of a batch so that the batch is completed in the specified time such as to conform to standard practice. Accordingly, in one embodiment the advanced batch controller receives input from other batches and utilizes that information in its control. In another embodiment, the objective is to complete the batch process in the shortest time possible so that the average rate at which product is produced is maximized. This is desirable since it produces economic benefits.

Since batches may not all run for the same total period of time, either overall or within a specified phase of the batch, some embodiments require that time over the entire batch or within a batch phase be warped so that all batches can be compared and modeled on a consistent basis. In such an embodiment, the evolution of the batch is warped against an indicator variable, which can be time itself, or another variable that may be more suited to describing the degree to which the batch has evolved. One example is conversion. The batch may be said to be complete when a certain percentage of one or more key materials have been converted, via reaction, to the finished product. In such an embodiment, the evolution of the batch can be warped so that the process variables are sampled at consistent increments in percent conversion, rather than consistent increments in time itself. In another embodiment, dynamic time warping methods, such as those developed originally to aid speech recognition, can be used to warp the measured process variables. Other related methods for warping the batch trajectory variables may also be used.

In one embodiment, controlled variables and manipulated variables can be given a specific target, with deviations penalized quadratically, or a by using a deadband range. In the latter case, the predicted variable value is penalized quadratically only when outside the deadband range. In one embodiment the model takes into account desired manipulated variable set points and the disturbance variables to formulate the desired objective.

In one embodiment, as discussed above in reference to the manipulated variables, the controlled variables are assigned relative weights that can be forced to sum to one. In other embodiments the relative weights are not forced to sum to one. As stated previously, those skilled in the art will be able to determine the relevant weights to assign to the different controlled variables. In addition, the controlled variables can be in scaled rather than their original engineering units. These considerations help maintain a consistent magnitude for this term regardless of the number of controlled variables or choice of engineering units, thus aiding controller tuning.

In one embodiment, the model further comprises a feedback mechanism. Feedback from measurements of the control output variables from previous batches is provided via a feedback bias term for at least one or more controlled variables. Thus, information on the actual measured product quality or process conditions reached in a batch are compared to the values of those predicted by the model. Corresponding feedback corrective action can then be applied to the model predictions for subsequent batches. The feedback corrective action can be calculated in a variety of methods including using an exponentially weighted moving average of the error. Another method includes using a process disturbance model.

Figure 1C:
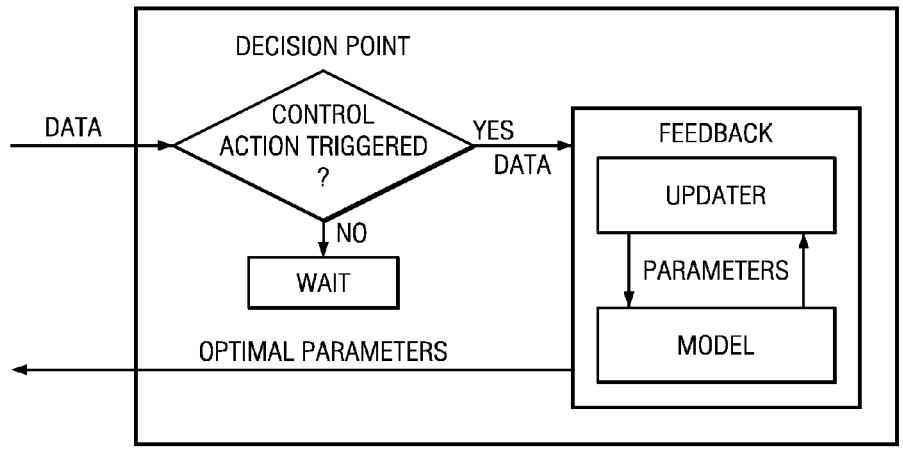
FIG. 1c illustrates the feedback architecture in one embodiment.

FIG. 1c illustrates the feedback architecture in one embodiment. As depicted, the feedback mechanism receives data. The data can be received from the PLC controller or from other means such as data sent from an off-site quality control laboratory. The feedback updater and the model will then determine new optimal parameters which can be utilized by the advanced batch controller.

In one embodiment, the controlled variable bias is updated automatically by an appropriate choice of filtering on the error between the predicted and measured values. This feedback mechanism can integrate out sustained offsets between predicted and measured values. These offsets can be due to a variety of circumstances including measurement drift whereby a sensor or other measurement equipment begins to drift over time. A feedback mechanism accounts for and overcomes such offsets. Thus, in one embodiment, the feedback mechanism allows the model predictions to remain accurate over time.

In one embodiment the parameters of the model itself are updated recursively with time in response to the feedback described above. Thus, in one embodiment the model itself is made to track changes in the process, therefore maintaining accurate model predictions over time.

In one embodiment, a partial least squares model is used to describe the batch process and adherence to this model is enforced via penalty terms on Squared Prediction Error (SPE) and Hotelling's $T^2$. Those skilled in the art will understand that these and other such methods can be used to determine if the extrapolation exceeds the space of the model. Other such monitoring tools and methods can be utilized to monitor the error of the model. The Partial Least Squared model can include snapshot inputs, trajectory variables and/or customized features extracted from the trajectory variables. Similarly, in one embodiment, the control outputs can comprise a snapshot measurement and/or trajectory variables, such as particle size distribution for example. In one embodiment, the SPE and Hotelling's $T^2$ terms are normalized, for example by their respective 95% confidence limits. Alternatively, other embodiments the confidence limits are greater than about 95%, whereas in other embodiments the confidence limits are about 99%. Virtually any confidence limit can be used. This helps maintain a consistent magnitude, which aids controller tuning In one embodiment, the SPE, Hotelling's $T^2$ and manipulated variable penalty terms each have an overall penalty weight. This allows the relative importance of all terms in the optimal control objective function to be weighted appropriately.

In one embodiment the control output is checked against one or more criteria including, but not limited to, SPE, Hotelling's $T^2$, individual score values, and/or optimization convergence criteria in order to determine whether or not to control the control calculations. In one embodiment, explicit constraints are applied to SPE and Hotelling's $T^2$ in the quadratic programming formulation, as seen in equation (1). Alternatively, in another embodiment, these statistical variables are not explicitly constrained during the optimization problem. Instead, the values of SPE and Hotelling's $T^2$ corresponding to the optimal solution are compared to the acceptable limits. If either is above such limits the control action is not implemented.

In one embodiment, once a model has been created, and the specific controller formulation specified in the control algorithm, the batch process is initiated. The optimal control is calculated at a key decision point during batch evolution. A decision point is a point in time where the created model and specified controller formulation is applied to obtain an objective. At the decision point the advanced batch controller, utilizing the model, can predict and/or control either the batch processing conditions or the product properties or both. The decision point or points can be located at various times throughout the batch. The location of a decision point can be time dependent or dependent upon the happening of a triggering event. Thus, a decision point may be located a time of 2 minutes into the batch processing or the decision point may be located when the batch reaches a specified temperature, pressure, percentage conversion, addition of a key material, initiation of a specific processing step such as heating, agitation, etc.

In one embodiment the results of the model calculations at a given decision point are written synchronously to one or more data sinks. One embodiment utilizes a generic data platform for this purpose. Likewise, in one embodiment the data is acquired synchronously at a given decision point from one or more data sources, such as at the plant, in real-time. For example, if one of the inputs is material initial temperature, the data related to that input can be received from a thermocouple and introduced into the model to perform the calculations at the decision point. If the desired data is missing or not yet available, missing data imputation methods can be used at a given decision point. Missing data imputation allows the predictions and control to be performed using only the available measurements with minimal impact due to the missing measurements. Missing data imputation methods for latent variable models include but are not limited to, single component projection (SCP), projection to the model plane (PMP), conditional mean replacement (CMR), trimmed score regression (TSR) expectation maximization (EM) and optimization based approaches for imputing the missing values as known by those skilled in the art.

In other embodiments the model can specify the input instead of receiving the actual input from a data source. As an example, in one embodiment a first decision point specifies the mass of a particular material to be added to the batch. A second decision point thereafter can later use the measured actual mass added, if it is available. If it is not available it can be estimated using missing data methods as described above.

In one embodiment data reconciliation is applied for all inputs and control outputs to screen for gross errors in the measured inputs or outputs. Measurements that are deemed unreliable are set to missing and are reconstructed using the data correlation structure captured by the corresponding model, via a missing data method, as described above. For example, if a measured input is routinely 300° F. and the measured temperature is 4,000° F., then that measurement can be deemed missing and replaced by methods described above.

Some processes may only require a single decision point. Other embodiments comprise one to two decision points. Other embodiments comprise one to three decision points, whereas other embodiments comprise one to four or more decision points. In other embodiments ten or more decision points are utilized.

Multiple decision points are possible and each can have its own unique model and/or own unique control objectives. Put differently, in some embodiments a separate model is created and utilized for each decision point. In other embodiments a single model is used for each decision point. In still another embodiment a single model is used for a plurality of decision points, and separate models are used for one or more of the other decision points. Those skilled in the art will be able to determine if a separate model is required for each decision point, or whether two or more decision points can use the same model. Likewise, in some embodiments separate control algorithms are created and utilized at each decision point whereas in other embodiments the same control algorithm is used for each decision point.

In one embodiment, at the decision point the selected inputs are inserted into the model. The model's outputs together with the specified control algorithm are used to control and operate the batch until the next decision point or until the end of the batch. As an example, the model at the decision point may determine that to reach the specified final product property of the batch must be increased and held for a period of time. The advanced batch controller can then increase the temperature as specified by the optimal solution on the model and hold it for the suggested period of time. Thereafter, a second decision point can then offer additional process control instructions or the batch would finish. The second decision point can occur after the hold time suggested by the first decision point or it may occur before the suggested hold time has expired.

In one embodiment the decision points have separate objectives. In one embodiment the objectives are dissimilar. For example, one decision point may have an objective of calculating and obtaining the next process condition set point. The process condition set point can be a desired temperature, pressure, etc. As an example, at a decision point the advanced batch controller takes the inputs and calculates the next desired temperature set point. The advanced batch controller at that decision point then instructs the PLC or equivalent control layer how to proceed in order to reach the new desired temperature set point. Put differently, this decision point determines the set point of a desired process variable trajectory. The advanced batch controller then adjusts the system as necessary to obtain the desired process variable trajectory. In the case of a temperature trajectory, the advanced batch controller adjusts the system to mimic the desired temperature trajectory.

Thereafter, in one embodiment a second decision point has a dissimilar objective of reaching a final product property or an intermediate product property. As noted, a second decision point can take place any time after a first decision point. The second decision point can take place a specified time following the first decision point, or it can occur after an initiating event such as a set point being reached or the happening of an event such as an agitator initiating. In the example above wherein the advanced batch controller at a first decision point calculates a desired temperature set point, the second decision point can take place at, prior to, or subsequent to the reaching of that calculated desired set point. Thus, in one embodiment the first decision point has an objective of reaching a desired temperature, whereas a second decision point has an objective of obtaining a final product moisture content. The model at the second decision point predicts the final product moisture content, compares the predicted with the desired moisture content, and the advanced batch controller adjusts process variables as necessary. Virtually any final product property which has any correlated effect with a process variable can be controlled. In one embodiment a batch process comprises a plurality of decision points at which time the model predicts the final product property or properties.

Further, in one embodiment multiple final or intermediate product properties are sought simultaneously. In such a case each final or intermediate product property can be assigned a relative weight so that the model knows which property is the primary consideration.

In still other embodiments two or more decision points may have similar objectives. Continuing the example from above, one embodiment comprises a decision point wherein the advanced batch controller calculates a temperature set point and controls to mimic the desired temperature trajectory. Thereafter at a second decision point the advanced batch controller recalculates the temperature set point so that the desired temperature trajectory can be reached. Three, four, and/or five decision points each calculating process conditions then follow. Finally, a sixth and final decision point calculates process variables so that a final product property is reached.

One skilled in the art can appreciate that decision points having dissimilar objectives can be intermixed. Carrying the previous example, a first decision point calculates a temperature set point and controls the batch to mimic the desired temperature trajectory. Subsequently, a second decision point calculates the predicted final product property and determines if it is within acceptable tolerances of the desired final product property. If the advanced batch controller determines that the desired product property will not be reached it can readjust the process by adjusting one or more process variables. Thereafter, a third decision point recalculates the temperature set point and controls the batch as necessary to mimic the desired temperature trajectory. Subsequently, a fourth decision point determines if any action is necessary to obtain the desired final product property. The process can be repeated as necessary.

In one embodiment, at a given decision point, the advanced batch controller always calculates and implements a control action. Conversely, in another embodiment the advanced batch controller predicts what the intermediate or final product quality will be if the nominal processing conditions are adhered to. If it is predicted that the intermediate or final product quality will fall within an acceptable tolerance region, the advanced batch controller does not calculate and implement any control action. Put differently, in such an embodiment the advanced batch controller allows the nominal processing conditions to be adhered to.

Implementation

Once an advanced batch controller is in place the resulting data can be tracked. In one embodiment the history and product information for each batch is packaged into a generic data structure and stored electronically. In other embodiments a summary of the history and product information from each batch is collated and stored electronically in a log file.

Once created the advanced batch controller can reside in any location that allows it to be coupled to the plant control layer such as the PLC or DCS. Thus, the advanced batch controller can reside on a computer that is a node on the plant control Local Area Network (LAN), in communication with a plant control server, etc. The advanced batch controller can be located on site or can be stored remotely and operate via the internet or wireless network. Those skilled in the art will understand the various ways to couple the advanced batch controller with the existing control system.

In one embodiment, the advanced batch controller acts in a supervisory manner on top of the existing PLC/DCS based control layer. In some embodiments the system acts like an autopilot which can instruct and override the existing PLC/DCS based control layer as necessary. In one embodiment the advanced batch controller is accessed, configured and monitored through the design of a user interface for graphical display of calculated multivariate data. In another embodiment the controller is accessed, configured and monitored through the design of a user interface for manual entry and manipulation of targets, bounds and various tuning parameters that affect controller execution.

Figure 2:
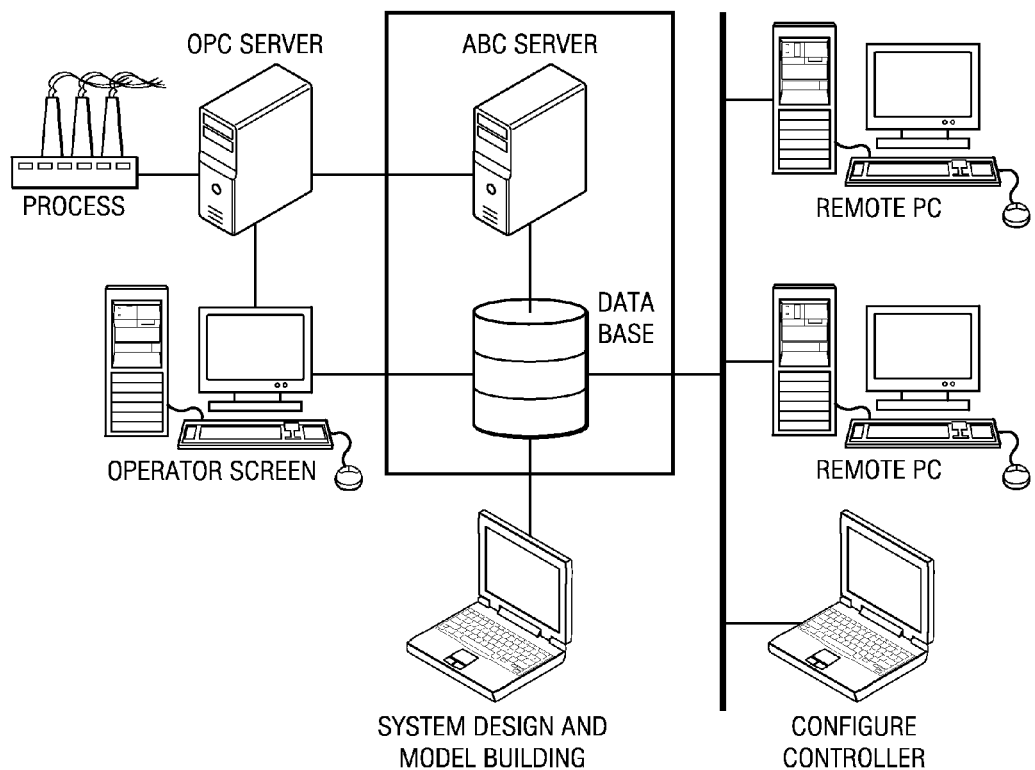
FIG. 2 illustrates the connectivity of the advanced control system in one embodiment.

FIG. 2 illustrates the connectivity of the advanced batch control system in one embodiment. In the embodiment depicted the process to be monitored and controlled is connected to an Object Linking and Embedding for Process control (OPC) server. The OPC server is coupled to an operator's computer which oversees and monitors the process. In one embodiment the operator has an override which allows he or she to control the system directly. Also coupled to the OPC server is the advanced batch control server. As discussed, this server can be located on site or be located remotely. Further, in one embodiment a single server acts as both the OPC and the advanced batch control server. Coupled to the advanced batch control server is a database. The database pulls and archives data received from the process. The data can be received from either server or the operator's computer. The database may be located on a separate server, or may be integrated into either the OPC or the advanced batch control servers. Those skilled in the art will understand that in some embodiments a single server or computer can serve all purposes described.

Also coupled to the database is a system design and model building tool. In one embodiment this tool comprises a computer having optimization software. The system design and model building tool can be connected at all time so that the model is constantly updated and adjusted. Further, the tool may adjust the model at regular times, either automatically or via manual intervention. In one embodiment, a model building and refining exercise is performed by process personnel using suitable software. In other embodiments after the model is created then the model building tool is not connected to the system. While model building is described, those skilled in the art will understand that the tool can also be used for re-building of the models.

In one embodiment, also coupled to the database are one or more computers. I one embodiment, these computers are remote. These computers allow the process to be monitored and/or controlled in real time. An example would be a computer for a plant manager that can oversee the processes of several processes remotely. In one embodiment, these remote computers can only receive data. Thus, they can view the process but otherwise exert no control over the process. In other embodiments, however, the remote computers can exert control over the system. Further, in one embodiment the remote computers can update targets, bounds and various tuning parameters that affect controller execution in real-time. In one embodiment there is a real-time view on the batch evolution and the advanced batch control implementation is provided via a view client that can run in a web browser. Such an embodiment allows seamless access from any computer that can connect to the network to which the computer running the advanced batch controller is connected.

In one embodiment, the advanced batch control server receives data. The data is then transmitted to the necessary unit which runs the model on the received data. The control output variables are then relayed to the OPC server which implements its instructions to the process. At the next decision point the model will incorporate the necessary inputs and relay a second set of control output variables. The process is repeated until the batch is completed. In one embodiment data from completed batches is stored so that the model can be adjusted as needed. Accordingly, in one embodiment the model is being adjusted with the completion of each batch. In another embodiment the model is adjusted, if needed, after a specified number of batches have been completed.

Figure 3:
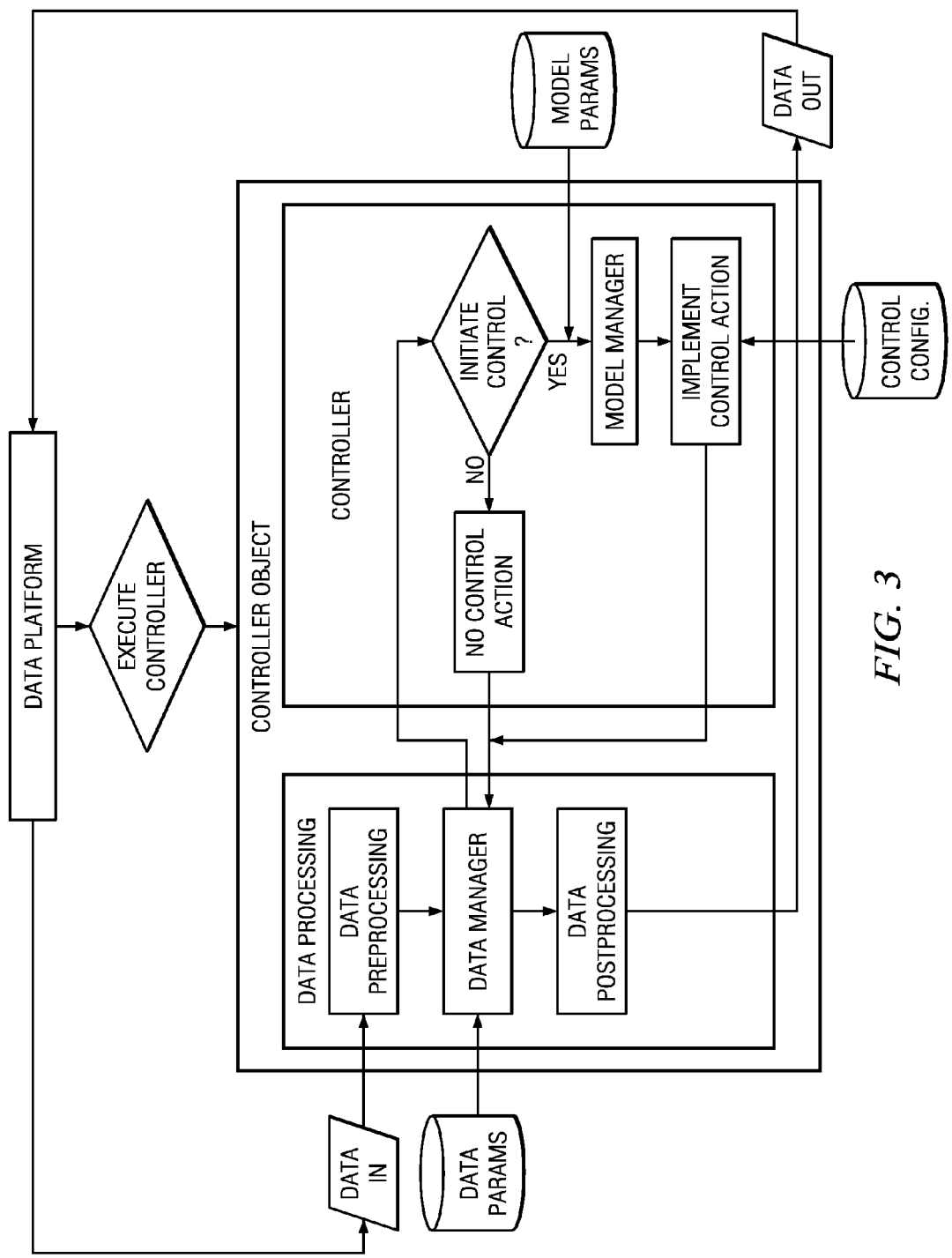
FIG. 3 is a flow diagram for one embodiment.

FIG. 3 is a flow diagram for one embodiment. The diagram demonstrates, among other things, the logic utilized to determine if control action is required in one embodiment. At the decision point the model can predict, for example, a final product quality. If the predicted property is within the acceptable tolerance of the desired property then no action may be needed. This decision is then passed to the data manager and then down to the PLC control layer. If the predicted property is not within the acceptable tolerance of the desired property then action is necessary. The advanced batch controller then makes the necessary adjustments to system. The diagram also shows where data parameters, such as constraints or necessary product conditions can be inputted into the platform. Further, the figure illustrates an embodiment wherein the advanced batch controller calculations are modularized by use of encapsulated structures for the data object as shown by the DATA PARAMS, the model object as shown by the MODEL PARAMS, and the controller configuration object shown by the CONTROL CONFIG. In one embodiment the model, control algorithm, and the data are handled via encapsulated structures in software to streamline the code and provide a packaged record of all conditions related to the execution of each batch cycle. In one embodiment the model object comprises the math model, for example as determined by Partial Least Squares. In one embodiment the controller configuration comprises the parameters that define the objective function and constraint set of, for example, the equation defined in equation (1a) above. In one embodiment, the data object comprises an electronic record of the data received from both the batch, and the advanced batch controller. Having a modularized structure has several benefits. First, it allows the code to be modular which results in streamlined code. Second, it allows for the packaging of recorded data. After a number of batches are completed the results, predictions, parameters, etc. can be summarized and stored for later retrieval and utilization. For example, the data from multiple batch cycles can be retrieved in a suitably packed form and used to update the model parameters for online use. This activity is demonstrated by the label "System Design and Model Building" in FIG. 2. The data can also be used to provide summaries of the performance of the advanced batch controller, which can be used to report to management, decide when to schedule maintenance on the models and/or control algorithms, etc. An additional benefit in one embodiment is that the models can be built and maintained so that the models are current and reflect process operation faithfully. In one embodiment the models can be rebuilt in a separate software package. In one embodiment the rebuilding software package is ProMultiVariate made by ProSensus, Inc., of Hamilton, Ontario, Canada. In one embodiment the modular encapsulation allows the users to better summarize each batch. Additionally, in one embodiment the modular encapsulation allows easier integration with analytical tools such as Matlab. Accordingly, in one embodiment the modular encapsulation standardizes the data structure.

Figure 4:
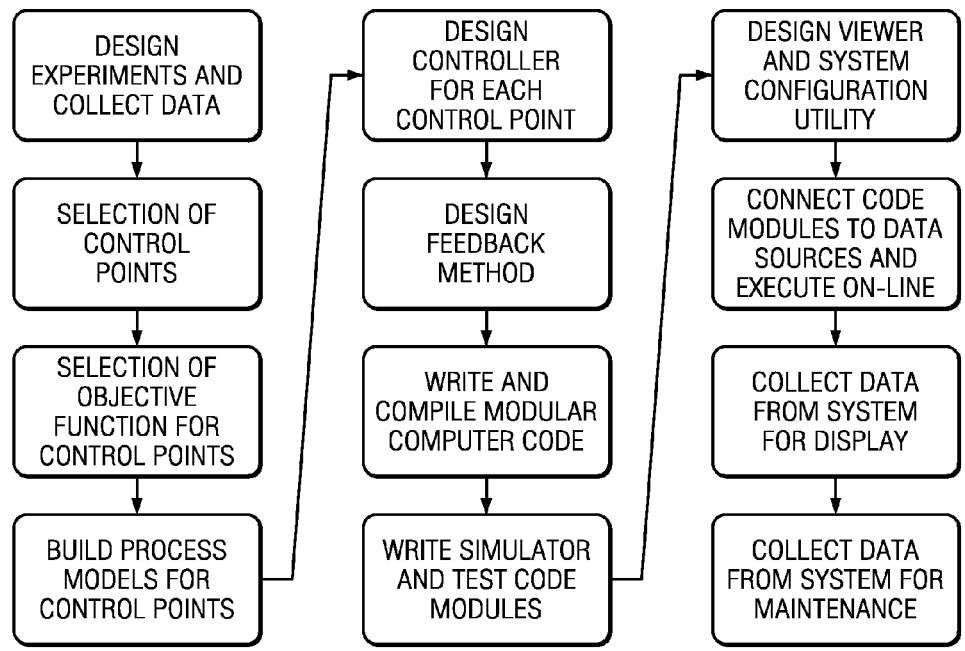
FIG. 4 is a flow chart illustrating the system development in one embodiment.

FIG. 4 is a flow chart illustrating the system development in one embodiment. The chart begins with designing experiments which will allow the user to collect the relevant data.

Such an experiment can be used to determine any rough correlations between process variables and final product properties. Thereafter a feedback method is designed, if desired, and the viewers are designed.

The advanced batch controller results in increased control over the batch and decreased product variance. Because, in one embodiment, the advanced batch controller is a feed forward control system as opposed to a feedback control system, the controller can more consistently achieve the desired product properties. In one embodiment, final product property variability decreases by about 50% compared to the variability without the advanced batch controller. In another embodiment, final product property variability decreased by more than 50% compared to the variability without the advanced batch controller.

Kettle Batch Example

One embodiment utilizing advanced batch control of a batch kettle fryer will now be described. This description is for illustrative purposes only as the method can be utilized in a variety of embodiments.

Figure 5:
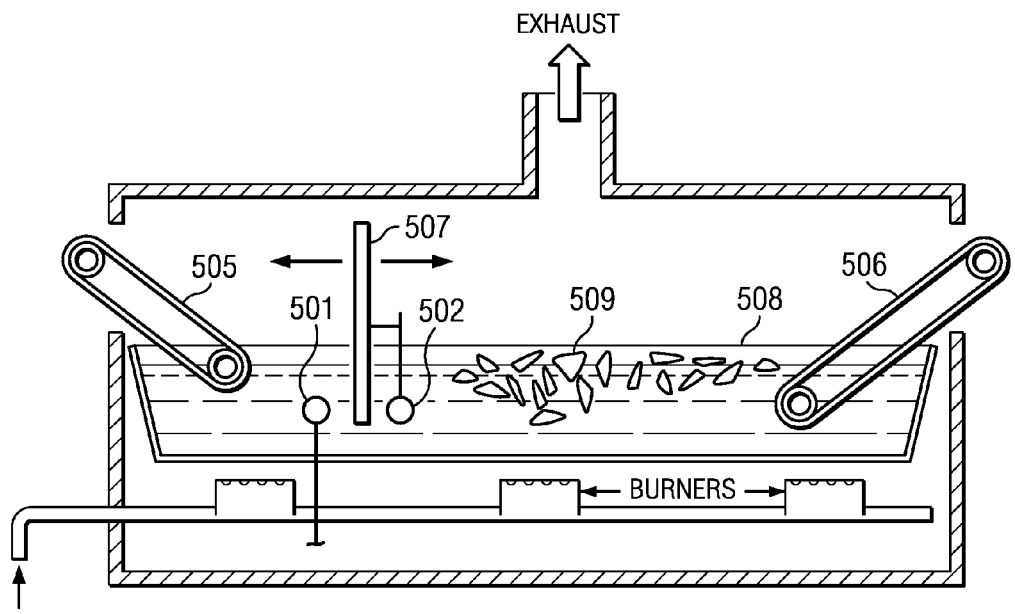
FIG. 5 illustrates a side-profile view of a kettle in one embodiment.

As the name implies, batch process kettle frying of potato chips involves placing a batch of potato slices in a kettle of hot oil, e.g., at a temperature of about 300° F. (about 150° C.). In the conventional kettle fryers used in the production of kettle-style chips, the cooking oil temperature follows a generally U-shaped time vs. temperature profile as illustrated in FIG. 5 of U.S. Pat. No. 5,643,626, assigned to the same assignee as the present invention, the entire disclosure of which is hereby incorporated by reference. Upon introduction of the potato slices into the oil, the temperature of the oil typically drops quite rapidly by as much as 50° F. (about 28° C.) or more. This drop in temperature is partially due to the introduction of a large mass of comparatively cooler potatoes. As depicted by FIG. 5, the oil temperature falls to a low point temperature of about 240° F. (116° C.) for a low point time of about 4 minutes. After measuring the low point temperature, heat to the kettle is then quickly increased and then the temperature of the oil begins to gradually rise, reaching about the initial frying temperature of about 300° F. (roughly 149-150° C.). The resultant potato chip has a moisture content of between about 1.5% to about 1.8% by weight.

The modern kettles that are utilized in batch processes are generally manufactured of stainless steel, and vary in size and capacity. FIG. 5 illustrates a side-profile view of a kettle in one embodiment. As depicted the kettle 508 is heated by gas burners positioned directly under the kettle floor and supplied gas from a gas supply. In one embodiment, fryer capacities range from 100 to about 220 pounds of potatoes per batch. In another embodiment, the fryer comprises 140 to about 220 pounds of potatoes per batch. In another embodiment, the fryer comprises about 150 to about 170 pounds of potatoes per batch. In order to efficiently use a batch kettle fryer of a given size, it is necessary to maintain a particular "load" or amount of potato slices per volume of oil, in order to achieve the desired frying temperatures. These and other constraints provide limits on the amount of throughput using batch kettle fryers.

As depicted, the kettle 508 further comprises a stirrer 507. The stirrer 507 moves throughout the kettle 508 to stir the potato slices 509. In one embodiment, the stirrer 507 comprises two temperature probes: a stationary temperature probe 501 and a mobile temperature probe 502. The temperature probes can comprise any probe known in the art. In one embodiment, the stationary probe 501 is located toward the bottom of the kettle 508, though various locations are suitable. The mobile probe 502, in one embodiment, is located at about the same depth as the stationary probe 501.

In the prior art operation, once the batch was complete then the stirrer 507 was directed upstream whereby it subsequently pushed the potatoes out of the kettle 508 via the discharge conveyor 506. However, often there was a lag in time of about 30-40 or more seconds whereby the potatoes were ready to be discharged but the stirrer 507 was not in position. Thus, the batch could not discharge the potato slices until the stirrer 507 was positioned upstream near the entrance conveyor 505. This contributes to some product being fried for longer than the desired time, often increasing product variability. In an attempt to overcome these deficiencies, the stirrer 507 was positioned at the upstream end once a pre-discharge temperature had been reached. This approach, however, was insufficient to reduce variability.

There are several differences between the advanced batch controller as applied to the kettle fryer and the prior art control system. Previously, as discussed above, the high burner was instructed to initiate only after a minimum temperature was reached. The timeliness of this instruction was often delayed due to instrumentation lag. Thus, the prior art utilized a feedback control system which resulted in increased variability of final product properties such as moisture content. The advanced batch controller, however, utilizes a feed forward control. This allows the advanced batch controller to predict the time to switch to high gas flow rather than simply reacting to the temperature of the batch as monitored by a thermocouple which could introduce unwanted instrumentation lag. As will be seen below, application of the advanced batch control method results in more consistent final product properties, specifically moisture content.

Further, the advanced batch controller allows the pre-discharge temperature to be dynamically calculated based, in part, upon the location of the stirrer 507. For example, if the stirrer 507 is at the downstream end of the kettle 508, the pre-discharge temperature will be lower than if the stirrer 507 is near the discharge position located in the upstream end. In one embodiment, utilizing a dynamic pre-discharge temperature calculation reduced the standard deviation of the discharge temperature by over 50%. This reduction in variation improved the ability to make accurate predictions regarding final product moisture. In one embodiment the calculation is performed at the PLC layer.

Further, batch weight was often previously used as a tool to manipulate the processing time. In one embodiment, changes in batch weight results in increased product variability. In one embodiment, applying advanced batch control allows the processing time and other such variables to be achieved while keeping the batch weight constant. This results in decreased variability.

A series of kettle chip batch process cycles were first monitored and the resulting data collected. The monitored operation was similar to the embodiment depicted in FIG. 4. A BF360 Batch Fryer from Heat and Control, Inc. of Hayward, Calif. was used as the kettle.

To obtain models which capture fundamental relationships in the process variables measured, a designed data collection procedure was established and followed. High and low values for many process variables were specified. In one embodiment, these included, the weight of potatoes fed to the fryer ("batch weight"), the solids content of said potatoes, the initial oil bath temperature at the start of the batch, the flow rate of heating gas at low fire at the start of the batch, the time to switch from low fire to high fire, the gas flow at high fire, the period of time to hold the high fire condition ("high fire duration"), the gas flow at low fire after switching from high fire, and the recovered oil temperature at which to begin discharging potato chips from the fryer. In one embodiment, a multivariate model was created using partial least squares. As noted above, however, methods other than partial least squares can also be used to develop the model.

One embodiment comprised two decision points. It was found that with some embodiments of this particular batch process two decision points offered better control and decreased variance compared to a single decision point. The variables used in the optimization problems solved at the first and second decision points were constrained with bounds to ensure that any suggested settings are reasonable and will not pose operational difficulties when applied at the PLC layer. For example, lower and upper bounds were placed on the gas flow at low or high fire conditions so that extreme deviations from the nominal values were prevented. Similarly, lower and upper bounds were specified on the mass of potatoes that the advanced batch controller could specify to be fed to the batch. In like manner, lower and upper bounds were placed on high fire duration and also on the temperature at which discharge of potato chips commences, etc. Similar to specific target values that are inputted into the advanced batch controller, these bounds can be set. The models at both decision points comprised bound settings defined in configuration files that can be modified as needed over time to ensure continued good operation of the controllers.

In one embodiment the high fire flow rate was set to range between about 2,500 to about 4,500 scfh. In such an embodiment, the max capacity on the burner was 4,500 scfh. Thus, the high fire flow rate in the algorithm was constrained to be below 4,500 scfh. In one embodiment, the low fire flow rate was set to range from about 300 to about 1,000 scfh.

In one embodiment, the lower bound on high fire duration was calculated dynamically for each batch so that the advanced batch controller could not specify a time to switch back to low fire that was earlier than the location of the second decision point. This provides a specific example of the method of modifying constraints on the control problem dynamically.

Figure 6:
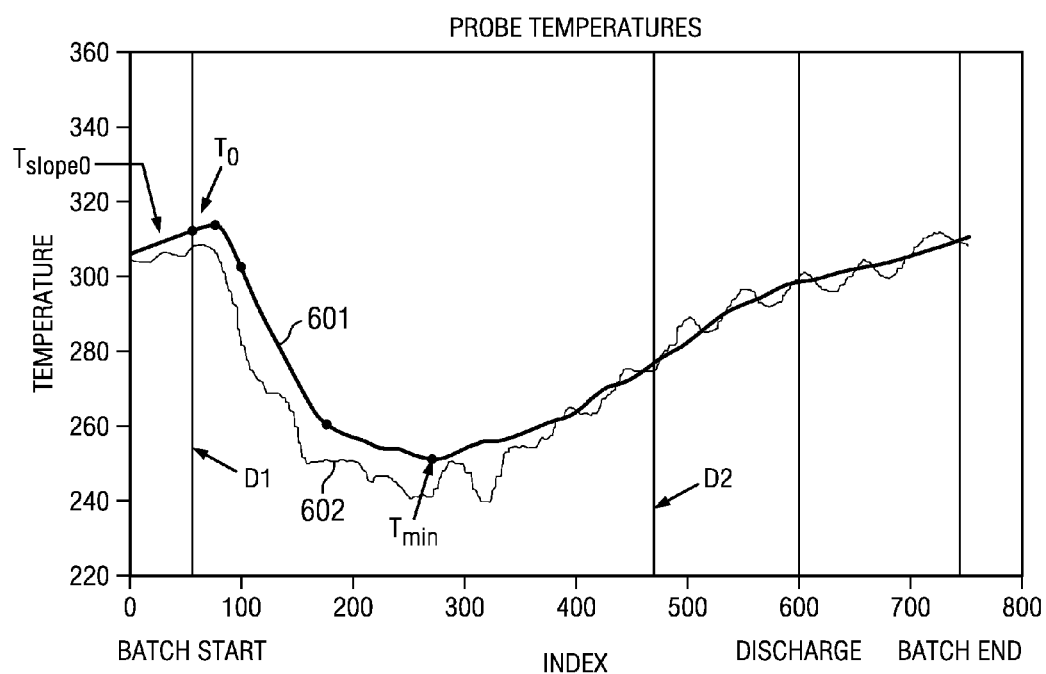
FIG. 6 is a graphic depiction of one batch topography showing temperature trajectories against time.
Figure 7:
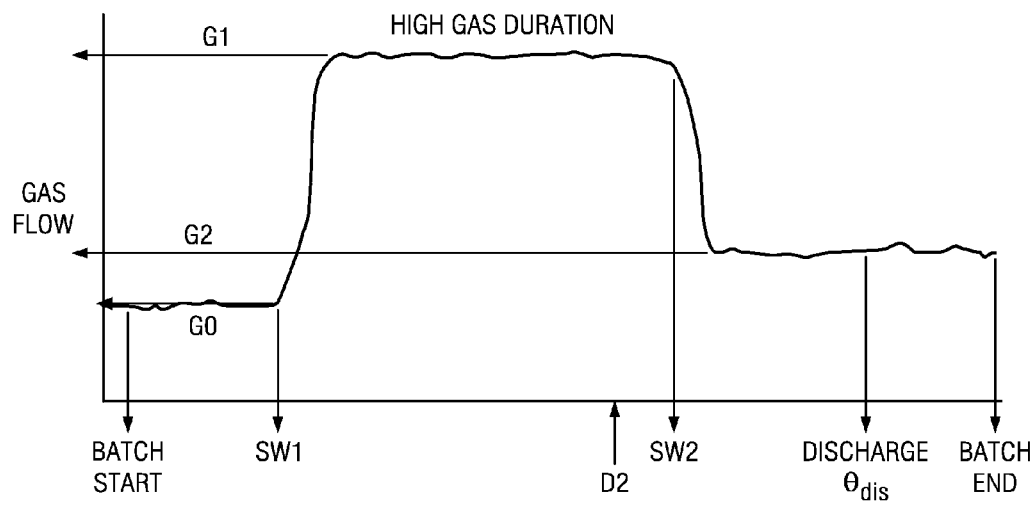
FIG. 7 illustrates the gas flow rate profile of a kettle fryer in one embodiment.

The two decision points are illustrated in FIG. 6. FIG. 6 illustrates a temperature profile of a kettle fryer in one embodiment. The bold line 601 is the temperature profile as measured by the stationary oil probe 501. The light line 602 is the temperature profile as measured by the mobile temperature probe 502. In one embodiment, the initial temperature ($T_0$) was inputted into the model. Further, in another embodiment, the temperature difference between the temperature as measured by the stationary 501 and the mobile 502 probes was inputted into the model. In yet another embodiment, the slope of the temperature as measured by the stationary probe prior to the initiation of the batch ($T_{slope,0}$) was used by the model. This provides examples of data interpretation being utilized in the model formulation.

At each decision point the model defined the settings for variables used to control the batch process via a PLC server. The first decision point (D1) took place a short time after the batch begins. As can be seen in the figure, the temperature of the oil dropped rapidly after the introduction of the potatoes.

In one embodiment, the objective of the first decision point (D1) was to ensure the process reaches a desired minimum temperature. It is generally believed that the U-shaped temperature-time profile imparts the intense flavor and unique mouth feel characteristics of kettle-style chips. Accordingly, in one embodiment of the kettle process it is desirable that a minimum temperature be reached to control the U-shaped temperature-time profile. At the first decision point the model used its list of manipulated variables (MV's) to meet the chosen target for minimum temperature. This is done by simultaneously accounting for and/or adjusting batch weight (BW), the time at which to switch to high gas flow (SW1), and the initial gas flow rate (G0). In one embodiment the batch weight was targeted to a predetermined weight unless it was needed for control purposes. In one embodiment the measured variables that are available at the first decision point include the initial batch temperature and solids concentration of the potatoes. These disturbance variables (DV's) are compensated for by the advanced batch controller by manipulating the specified batch weight, low fire gas flow and switch time (MV's) to ensure that the targeted minimum oil temperature is achieved as closely as possible. For example, the advanced batch controller comprised the ability to increase or decrease the gas flow in order to increase or decrease the kettle temperature as needed based on the control output from the first decision point.

FIG. 6 illustrates the gas flow rate profile of a kettle fryer in one embodiment. As can be seen in the figure, the gas flow rate was changed from an initial flow rate (G0) to a high gas flow rate (G1) and to an intermediate gas flow rate (G2) depending on the outputs of the model. Further, the time between an initial (G0) and a high gas flow rate (G1) was also controlled by the advanced batch controller. It should be noted that in other embodiments the model can also comprise other process variables such as agitation, pressure, etc. As such, the first decision point (D1) resulted in adjustments to ensure a desired trajectory is achieved.

In one embodiment, the second decision point (D2) comprised an objective to reach a desired final product property, specifically moisture content. In one embodiment the desired final moisture content is about 1.6%. While in one embodiment moisture content was used as a control point, in other embodiments multiple final product properties can be simultaneously used as a control point. For example, the second decision point (D2) can be utilized to obtain a desired oil content, percent solids, color, level of a compositional compound including but not limited to Acrylamide, and percent purity or impurity. Further, as previously discussed, the final product properties can be assigned relative weights which signify which property is of primary significance, which is of secondary significance, etc.

The second decision point (D2) can include the data used in the first decision point (D1) calculation as well as the first decision point variables as measured in the process as a result of applying the first decision point control action. The input disturbance variables for the second decision point included the actual batch weight, potato solids percentage, initial oil bath temperature at start of batch, slope of oil bath temperature at start of batch ($T_{0,slope}$), time to switch from low to high gas fire (SW1), actual average low gas flow at start of batch ($G_{0,actual}$) actual average high gas flow ($G_{1,actual}$), trajectory of oil bath temperatures (stationary and wireless temperature probes) and the trajectory of the difference between these until the second decision point. The input manipulated variables included the duration of high gas flow period (HGD) as shown on FIG. 5, the temperature at which to start discharging the potato chips from the fryer ($T_{discharge}$), and the target for low gas flow at the end of the batch (G2). As noted above, the advanced batch controller can adjust a variety of process variables in order to reach the desired targets. Thus, the second decision point estimated both the discharge time and batch temperature of the batch.

The variables used in the optimization problems solved by the models at the first (D1) and second (D2) decision points were constrained with bounds to ensure that any suggested settings were reasonable. Further, they were constrained to ensure that they will not pose operational difficulties when applied at the PLC layer. For example, the maximum setting for high gas flow duration has an upper bound as previously described. Further, each of the first and second decision point advanced batch controllers bound settings are defined in configuration files that can be modified as needed over time to ensure continued good operation of the controllers.

As noted previously, the location of the stirrer 507 often prevents the potatoes from discharging at the desired time and/or temperature. To overcome this problem, the location of the stirrer 507 was inputted into the control algorithm. This allows one objective to ensure that the stirrer 507 is in the upstream location when the discharge temperature is reached. Accordingly, the discharge temperature, and the associated trajectory, can be adjusted to ensure the stirrer 507 is positioned as desired when the appropriate discharge temperature is reached. In one embodiment the discharge temperature ranged from about 290° F. to about 320° F. In another embodiment the discharge temperature ranged from about 298° F. to about 308° F. In one embodiment, values for minimum temperature in the temperature profile ranged from about 245° F. to about 260° F. In another embodiment the minimum temperature ranged was about 255° F.

The application of the advanced batch control method resulted in significantly greater control over the system. This resulted in decreased variability which can translate into increased product compliance. Table 2, below, summarizes the results of the advance batch control on a batch kettle fry potato chip system. Data were collected on about 60 batches using conventional control and about 99 batches using advanced batch control. As can be seen, product moisture variability was reduced by about 53.8%, oil variability was reduced by about 57.0%, and minimum batch temperature variability was reduced by about 52.3%. The changes in the mean values for the controlled variables were the result of slightly different choices of set point targets for these values over the values that commonly result form the pre-existing control system prior to implementing advanced batch control.

TABLE 2

Variance Reduction Summary

| Parameter | No ABC Control | With ABC Control | Percent Change |
|---|---|---|---|
| Moisture | | | |
| Mean | 1.514 | 1.658 | 9.457 |
| Std. Dev. | 0.107 | 0.049 | −53.788 |
| Variance | 0.011 | 0.002 | −78.645 |
| Oil | | | |
| Mean | 28.194 | 31.654 | 12.271 |
| Std. Dev. | 2.490 | 1.070 | −57.039 |
| Variance | 6.202 | 1.145 | −81.544 |
| Minimum Temp. | | | |
| Mean | 253.639 | 249.237 | −1.73534 |
| Std. Dev. | 3.558 | 1.696 | −52.3227 |
| Variance | 12.658 | 2.877 | −77.2687 |

As discussed above, the methodology applies to batch and semi-batch processes, and transient portions of continuous processes. One such example is the batch production of tortilla chips. Corn is typically stored and processed in kettles and cooked for a period of time until a desired hydration is obtained. Advanced batch control can be applied to this process to ensure the desired hydration is obtained by adjusting processing time, temperature, and other variables.

Advanced batch control can also be applied to vacuum frying and/or baking. In both of these processes one final product property that is controlled is final moisture content. The advanced batch control method can be used to optimize the process control, obtain the final moisture content, and reduce product variability.

Likewise, advanced batch control can be applied to liquids as well. One example is brewing of beer whereby the amount of hops, grains, water, yeast, as well as the process conditions can be optimized to increase control and reduce product variability. Another example is in the batch processing of certain dairy-based products such as cheese, casein, yoghurt, butter, ice cream, specialty dairy-based powders, dairy-based desserts, chocolate, etc.

The advanced batch control method can be applied to non-food processes as well. One such example is a batch polymerization process. In one embodiment, at a decision point at the start of the batch the advanced batch controller can adjust the amount of initiator or catalyst or the temperature of the reactor to compensate for measured material property variations, while at decision points later in the batch cycle the controller can use measurements on the temperature trajectories, the agitation power, the reactor pressure, etc. to adjust manipulated variables such as the initiator or monomer feed rates, the reactor temperature, the desired batch duration, etc. in order to achieve a desired molecular weight, viscosity, particle size, etc for the final product.

These processes can be continuous in nature, such as a polymerization process, but as discussed above, comprise portions that are transient. One specific example is the changing of a product grade in a continuous polyolefin process. During this change the process operation is moved from producing one product grade with desired melt index and density properties to another grade with different values of these properties. The advanced batch control method can be applied during this transient time in order to optimize the transition, for example by completing the transition in the shortest possible time which minimizes the amount of product that does not comply with the specifications of either grade. Alternatively, many polymer products are produced in batch reactors. One example includes emulsion polymerization reactors. In such embodiments advanced batch control can be used to implement corrective action at one or more decision points during batch evolution so as to minimize variability in final product quality, amongst other possible control objectives.

The method can also be applied in measurement analytics. In many of these analytics variances as high as or higher than 15% are acceptable. One example of such analytics includes a gas chromatograph. This machine operates as a batch process. As such, advanced batch control methods can be applied to optimize the consistency of operation of the machine.

The method also has application in many bioreactors. Examples include ethanol fermentation, biopharmaceutical production, and waste water management. Waste water management often operates as a series of batch processes with each process having a desired goal for the treated water. The applied method can optimize control over the process and decrease variability in the quality of the treated water. In bioreactors control is applied at various decision points to manipulate the feed rate of nutrients, adjust the temperature pH or dissolved oxygen level in the medium in order to achieve high yields of final product and constrain the concentrations of various byproducts in the final product to fall within acceptable limits.

The method also has application in many metal operations such as the production of steel or aluminum. Aluminum is often produced with electrolysis in a smelter. This batch process can be optimized with the advanced batch control method. Steel is produced in electric arc or basic oxygen furnaces and the final composition of Carbon, for example, can be controlled by using the advanced batch controller to manipulate the amounts of various additives charged to the vessel and energy added to the process at various decision points during the batch.

Many semiconductors are manufactured in batch processes. The advanced batch control method can be utilized in the processes of vapor deposition and etching, among others, to control and achieve the final properties of the products at the end of the batch. As one example, the thickness of the deposited or etched layer on a wafer can be controlled by manipulating gas feed rates, and the desired end time for the batch.

The method can also be applied in the manufacturing of specialty chemicals, mining operations, adhesives, inks, agricultural chemicals, emulsion polymers, paints, bulk and solution polymers, powders, mixes, and active pharmaceutical ingredients, machined parts, reaction injection molding, etc. In the manufacture of pharmaceutical tablets the method can also be used to control coating thickness in batch tablet coating operations, powder properties in wet granulation processes and powder moisture in batch drying. As can be seen, the advanced batch control method can be applied across many industries and can be implemented to increase control, decrease variability and improve process efficiency and process operability.

While the invention has been particularly shown and described with reference to a preferred embodiment, it will be understood by those skilled in the art that various changes in form and detail may be made therein without departing from the spirit and scope of the invention.

Additional Description

The following clauses are offered as further description of the disclosed invention.

1. An advanced batch control method for a batch process comprising the steps of:
   a. completing at least one cycle of said batch process, wherein said batch process comprises the processing of a material;
   b. collecting data on at least one process variable and at least one product property;
   c. creating at least one model for the batch process based on said data, wherein said model comprises model inputs and model outputs;
   d. creating at least one advanced batch controller which uses said at least one model and said model inputs and model outputs;
   e. initiating said batch process;
   f. using at least one of said models and one of said controllers at a first decision point to obtain a first control output;
   g. controlling said batch process in accordance with said first control output.
2. The method according to any preceding clause, further comprising:
   h. using at least one of said models and one of said controllers at a second decision point to obtain a second control output;
   i. controlling said batch process in accordance with said second control output.
3. The method according to any preceding clause, wherein said first control output comprises a process condition set point.
4. The method according to any preceding clause, wherein said controlling of step i) comprises adjusting at least one process variable.
5. The method according to clause 4, wherein said adjusting at least one process variable comprises reaching at least one process condition set point.
6. The method according to clause 4, wherein said adjusting at least one process variable comprises reaching at least one product property set point.
7. The method according to clause 2, wherein said second output is used to reach at least one product property.
8. The method according to clause 2, wherein said first control output comprises a process condition set point, and wherein said second control output is used to reach at least one product property.
9. The method according to clause 2, further comprising:
   j. using at least one of said models and one of said controllers at a third decision point to obtain a third control output;
   k. controlling said batch process in accordance with said third output
10. The method according to clause 9, wherein said third control output comprises a process condition set point.
11. The method according to clause 9, wherein said third control output comprises reaching at least one process condition set point.
12. The method according to clause 9, wherein said third output is used to reach at least one product property.
13. The method according to clause 9, wherein said third output comprises reaching at least one product property set point.
14. The method according to clause 9, wherein said using at step j) occurs after said controlling of step i).
15. The method according to clause 9, wherein said using at step j) occurs before said controlling of step i).
16. The method according to clause 9, wherein said controlling of step k) comprises adjusting at least one process variable to reach a desired finish time.
17. The method according to any preceding clause, wherein said collecting of step b) comprises collecting data on at least two process variables.
18. The method according to any preceding clause, wherein said first output comprises a process condition set point.
19. The method according to clause 18, wherein said process condition set point is temperature.
20. The method according to any preceding clause, wherein said first output is used to reach at least one product property.
21. The method according to clause 20, wherein said product property comprises a final product property.
22. The method according to clause 20, wherein said product property comprises an intermediate product property.
23. The method according to clause 20, wherein said product property comprises moisture content.
24. The method according to clause 20, wherein said product property comprises oil content.
25. The method according to any preceding clause, wherein said initiating a batch process comprises initiating a specialty chemicals batch process.
26. The method according to any preceding clause, wherein said initiating a batch process comprises initiating a polymer batch process.
27. The method according to any preceding clause, wherein said initiating a batch process comprises initiating an aluminum batch process.

28. The method according to any preceding clause, wherein said collecting of step b) comprises collecting data on at least two final product properties.

29. The method according to any preceding clause, wherein said collecting of step b) comprises collecting data related to temperature.

30. The method according to any preceding clause, wherein said collecting of step b) comprises collecting data related to a measurable property of said material.

31. The method according to any preceding clause, wherein said collecting of step b) comprises collecting data related to a process variable trajectory.

32. The method according to any preceding clause, wherein said initiating of step e) comprises inserting sliced potatoes into a kettle.

33. The method according to any preceding clause, wherein said controlling of step g) comprises controlling to reach a desired process variable trajectory.

34. The method according to any preceding clause, wherein said first decision point takes place a specified time after said initiating step.

35. The method according to any preceding clause, wherein said first decision point takes place upon reaching a specified process condition.

36. The method according to any preceding clause, wherein said first output comprises a minimum temperature set point.

37. The method according to any preceding clause, wherein said controlling of step g) comprises adjusting at least one process variable.

38. The method according to any preceding clause, wherein said creating of step c) comprises creating an empirical model.

39. The method according to any preceding clause, wherein said creating of step c) comprises using a partial least squares model type.

40. The method according to any preceding clause, wherein said creating of step c) comprises creating a model wherein said model comprises:
  disturbance variables
  manipulated variables
  controlled variables
  predicted variables.

41. The method according to any preceding clause, wherein said creating of step d) comprises defining an control algorithm that is specified as a quadratic programming numerical optimization.

42. The method according to clause 41, wherein said optimization formulation is specified as a nonlinear program.

43. The method according to clause 41, wherein said optimal control algorithm utilizes a weighting matrix to control the relative importance of said controlled variables.

44. The method according to any preceding clause, wherein said controller comprises a control algorithm.

45. The method according to clause 44, wherein said control algorithm utilizes a weighting matrix to specify the relative importance of said model inputs.

46. The method according to clause 44, wherein said control algorithm utilizes a weighting matrix to specific the relative costs of said model inputs.

47. The method according to clause 1, further comprising the following:
  h. measuring a product property;
  i. comparing said measured product property with a product property predicted by said model;
  j. applying feedback corrective action to one of said at least one models.

48. The method according to any preceding clause, wherein said creating of step d) comprises creating a controller comprising a control algorithm, wherein said control algorithm comprises constraints on said model inputs.

49. The method according to any preceding clause, wherein said creating of step d) comprises creating a controller comprising a control algorithm, wherein said control algorithm comprises constraints, and wherein said constrains are automatically adjusted in real-time to compensate for changes in said batch process.

50. The method according to any preceding clause, wherein said creating of step d) comprises creating a controller comprising a control algorithm, wherein said algorithm considers process condition set points.

51. The method according to any preceding clause, wherein said creating of step d) comprises creating a controller comprising a control algorithm, wherein said algorithm considers process variable set points.

52. The method according to any preceding clause, wherein said creating of step d) comprises creating a controller comprising a control algorithm, wherein said algorithm considers product property set points.

53. The method according to any preceding clause, wherein said creating of step d) comprises creating a controller comprising a control algorithm, wherein said algorithm applies a deadband around a process condition set point.

54. The method according to any preceding clause, wherein said creating of step d) comprises creating a controller comprising a control algorithm, and wherein said model explicitly penalizes deviations from a latent variable model plane.

55. The method according to any preceding clause, wherein said creating of step d) comprises creating a controller comprising a control algorithm, and wherein said model explicitly penalizes extrapolations from a latent variable model plane.

56. The method according to clause 2, wherein separate models are used in step f) and step h).

57. The method according to any preceding clause, wherein said first control output comprises a predicted finish time.

58. The method according to any preceding clause, wherein said second control output comprises a predicted finish time.

59. The method according to any preceding clause, wherein said controlling of step g) comprises adjusting at least one process variable to reach a desired finish time.

60. The method according to any preceding clause, wherein said controller further comprises a control algorithm, and wherein said model, said control algorithm and said data are handled via encapsulated structures.

61. The method according to any preceding clause, further comprising checking said first output using Hotelling's $T^2$ to determine whether or not to implement said first control output.

62. The method according to any preceding clause, wherein said creating of step d) comprises configuring said controller to run a series of batches according to a programmed design.

63. The method according to any preceding clause, wherein set points are specified for said inputs.

64. An advanced batch control method for a batch kettle fryer comprising the steps of:
  a. completing at least one cycle on said batch kettle fryer;
  b. collecting data on at least one process variables and at least one final product property, wherein said data comprises a temperature-time profile and said final product property comprises moisture content;

c. creating at least one model for the batch process based on said data;

d. creating at least one advanced batch controller which uses said at least one model;

e. initiating said batch process;

f. using one of said models and said controller at a first decision point to obtain a first control output, wherein said first control output comprises a desired minimum temperature set point;

g. controlling said batch process in accordance with said first control output;

h. using one of said models and said controller at a second decision point to obtain a second control output;

i. controlling said batch process in accordance with said second control output, wherein said second control output is used to reach a desired final product moisture content.

65. The method according to clause 64, further comprising the following:

j. using one of said models and said controller at a third decision point to obtain a third control output;

k. controlling said batch process in accordance with said third control output.

66. The method according to clause 65, wherein said third output comprises a process condition set point.

67. The method according to clause 65, wherein said third output is used to obtain at least one product property.

68. The method according to clause 65, wherein separate models are used in step f) and step g).

69. The method according to clauses 64-68, wherein said step c) comprises creating a model comprising manipulated variables, disturbance variables, controlled variables, and predicted variables.

70. The method according to clauses 64-69, wherein said creating of step d) comprises creating a controller comprising a control algorithm, wherein said control algorithm utilizes a weighting factor to specify the relative importance of said inputs.

71. The method according to clauses 64-70, further comprising the following:

j. measuring a product property;

k. comparing said measured product property with a product property predicted by one of said at least one models;

l. applying feedback corrective action to one of said at least one models.

72. The method according to clauses 64-71, wherein said creating of step d) comprises creating at least one control algorithm comprising constraints on said output.

73. The method according to clauses 64-72, wherein said creating of step d) comprises creating at least one control algorithm comprising constraints on said first output.

74. The method according to clauses 64-73, wherein said creating of step c) comprises creating a control algorithm comprising constraints, and wherein said constrains are automatically adjusted in real-time to compensate for changes in said batch process.

75. The method according to clauses 64-74, wherein said creating of step d) comprises creating a controller comprising a control algorithm, wherein said control algorithm considers process condition set points.

76. The method according to clauses 64-75, wherein said creating of step d) comprises creating a controller comprising a control algorithm, wherein said control algorithm considers process variable set points.

77. The method according to clauses 64-76, wherein said creating of step d) comprises creating a controller comprising a control algorithm, and wherein said control algorithm applies a deadband around a process condition set point.

78. The method according to clauses 64-77, wherein said initiating comprises introducing about 100 to about 220 pounds per batch into said kettle.

79. The method according to clauses 64-78, wherein controlling of step g) comprises reaching a batch weight set point.

80. The method according to clauses 64-79 wherein said controlling of step g) comprises controlling to reach said minimum temperature.

What is claimed is:

1. A method for controlling a batch process in a system comprising equipment for processing potato slices into potato chips, the equipment comprising a batch vessel, a burner, and a set of measurement equipment, the method utilizing feed forward control and the steps of the method comprising:

creating a set of models for the batch process based on data captured during completion of one or more prior cycles of the batch process, wherein each model in the set of models is a mathematical description of the batch process, and wherein the set of models provide model outputs based upon model inputs;

creating a set of batch controllers that generates a set of control outputs having instructions to adjust one or more manipulated variables of a set of process variables to achieve at least one predetermined process condition set point and at least one product property, wherein the set of batch controllers generate the set of control outputs from the model outputs;

initiating a subsequent cycle of the batch process;

at a first decision point, generating first control outputs with instructions to change one or more variables in a first set of manipulated variables with reference to data acquired at the first decision point, wherein the first set of manipulated variables comprises: a batch weight, an initial gas flow rate to the burner, and a switching time for initiating the high gas flow rate to the burner;

controlling, using the first control outputs, only a portion of the subsequent cycle of the batch process after the first decision point to achieve the one or more predetermined process condition set points, wherein the one or more predetermined process condition set points comprises a minimum temperature in an oil bath;

at a second decision point, generating second control outputs with instructions to change one or more variables in a second set of manipulated variables with reference to data acquired at the second decision point, wherein the second set of manipulated variables comprises a duration of high gas flow to the burner, a final oil bath temperature, and the final gas flow rate to the burner;

controlling, using the second control outputs, only a reminder of the subsequent cycle of the batch process to achieve the at least one product property, wherein the at least one product property comprises a moisture content of the potato chips.

2. The method of claim 1, further comprising:

completing the one or more prior cycles of the batch process, wherein the batch process comprises processing a first batch of the potato slices in the batch vessel to form the potato chips;

capturing data during the one or more prior cycles using the set of measurement equipment, wherein the data relates to the set of process variables; and identifying a set of decision points associated with the batch process, wherein the first decision point delineates an event for altering the batch process to achieve the one or more predetermined process condition set points, and wherein the second decision point delineates a different event for altering the batch process to achieve the at least one product property.

3. The method of claim 1, wherein the set of process variables comprises: the batch weight of the uncooked potato pieces, a solids content of the uncooked potato pieces, the initial oil bath temperature, the initial gas flow rate, the high gas flow rate, the switching time, the duration of the high gas flow rate, the final gas flow rate, and the final oil bath temperature.

4. The method of claim 1 wherein generating the first control outputs further comprises:
sending the data acquired at the first decision point to the set of models as first model inputs; and
generating a first set of model outputs using the model inputs.

5. The method of claim 1 wherein generating the second control outputs further comprises:
sending the data acquired at the second decision point to the set of models as second model inputs; and
generating a second set of model outputs using the second model inputs.

6. The method of claim 2 further comprising:
identifying a third decision point that delineates a third event for altering the batch process to achieve at least one product property or process condition set point;
at a third decision point, generating third control outputs with instructions to change one or more variables in a third set of manipulated variables with reference to data acquired at the third decision point; and
controlling said batch process by adjusting one or more variables of the third set of manipulated variables accordance with said third control outputs.

7. The method of claim 6 wherein said controlling comprises adjusting at least one process variable to reach a desired finish time.

8. The method of claim 1 wherein at least one of said first control outputs further comprises instructions for achieving at least one product property.

9. The method of claim 8 wherein said product property comprises a final product property.

10. The method of claim 8 wherein said product property comprises an intermediate product property.

11. The method of claim 1 wherein said initiating step comprises inserting sliced potatoes into a kettle.

12. The method of claim 1 wherein said controlling step according to the first control outputs comprises controlling to reach a desired process variable trajectory.

13. The method of claim 1 wherein said first decision point is identified at a specified time after said initiating step.

14. The method of claim 1 wherein said first decision point is identified upon reaching a specified process condition.

15. The method of claim 1 wherein one of said first control outputs comprises a minimum temperature set point.

16. The method of claim 1 wherein the set of models further comprises:
disturbance variables, manipulated variables, controlled variables, and predicted variables.

17. The method of claim 1 wherein creating the set of batch controllers further comprises:
creating a control algorithm, wherein said control algorithm comprises constraints on said model inputs.

18. The method of claim 1 wherein set points are specified for said inputs.

19. The method of claim 1, wherein said controlling, using the second control outputs, further comprises:
adjusting at least one process variable to achieve at least one product property set point.

20. The method of claim 6 wherein said controlling comprises adjusting at least one process variable to reach at least one product property.

21. The method of claim 6 wherein said controlling comprises adjusting at least one process variable to reach at least one product property set point.

22. The method of claim 1 further comprising the following:
measuring the product property to identify a measured product property;
comparing the measured product property with a predicted product property predicted by one or more of the set of models; and
applying feedback corrective action to the one or more of the set of models.

* * * * *